Jan. 14, 1930.  H. B. BERNARD  1,743,185
RECOVERY OF GASOLINE
Filed April 17, 1925
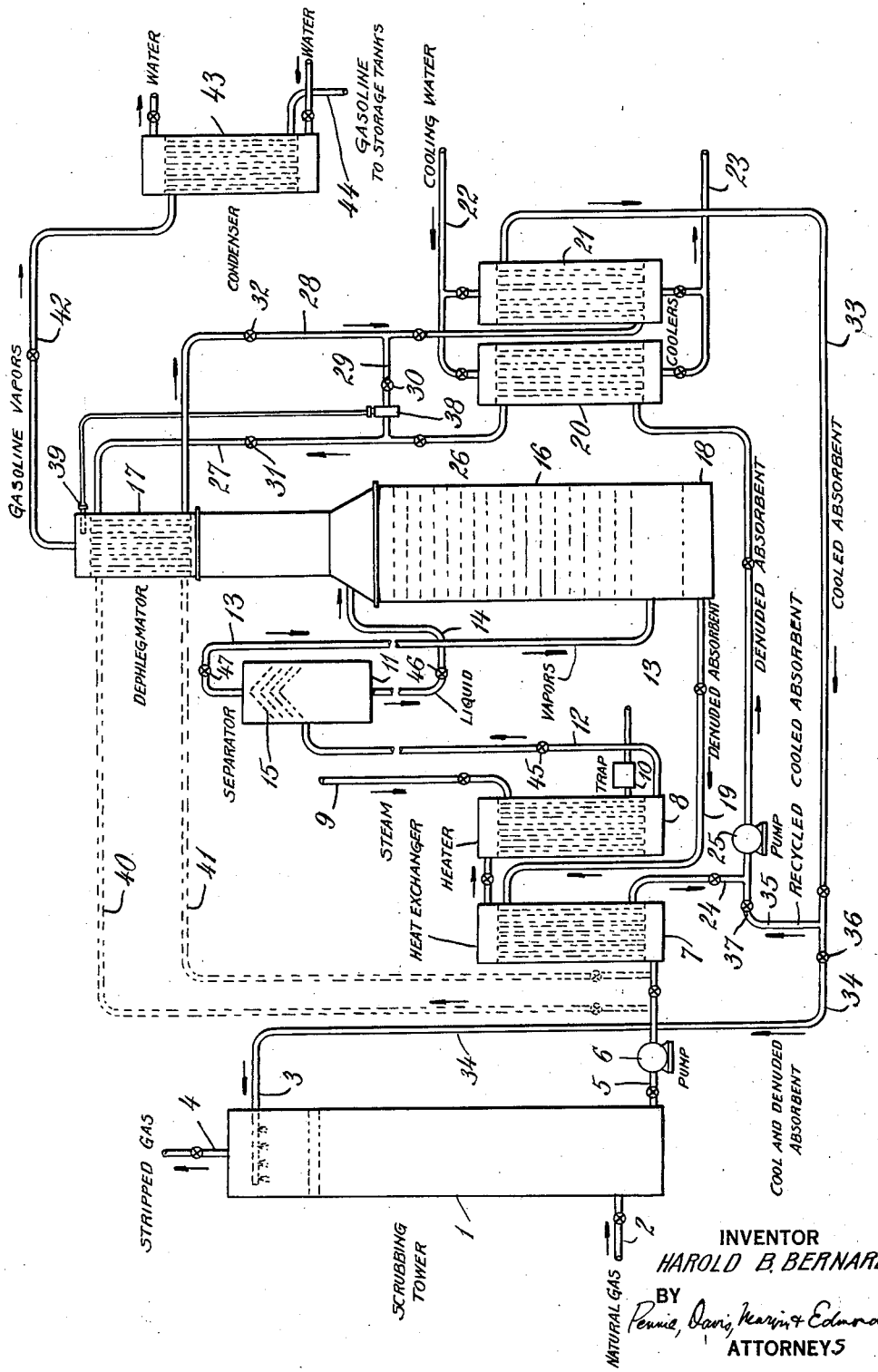
INVENTOR
HAROLD B. BERNARD
BY
Pennie, Davis, Marvin & Edmonds
ATTORNEYS Patented Jan. 14, 1930

1,743,185

UNITED STATES PATENT OFFICE

HAROLD B. BERNARD, OF TULSA, OKLAHOMA, ASSIGNOR TO SINCLAIR OIL AND GAS COMPANY, OF TULSA, OKLAHOMA, A CORPORATION OF MAINE

RECOVERY OF GASOLINE

Application filed April 17, 1925. Serial No. 23,828.

This invention relates to the recovery from natural gas and casinghead gas of liquid mixtures of hydrocarbons of the type commonly known as natural gas gasoline, natural gasoline and casinghead gasoline. These liquid hydrocarbon mixtures are of a light gasoline character and are particularly adapted for use in blended motor fuels in admixture with heavier hydrocarbons. This invention includes improvements in both method and apparatus for recovering these liquid hydrocarbons from such gas mixtures.

Briefly, in recovering natural gas gasoline from natural gas, or similar gaseous mixtures, by absorption in a liquid menstruum, the natural gas is subjected to treatment with a liquid absorbent capable of selectively dissolving or entraining the gasoline constituents, the stripped gas and the absorbent charged with gasoline are separated, the absorbed gasoline, or as great a part as possible or practicable, is distilled from the absorbent, the denuded absorbent is cooled and returned for further treatment of an additional quantity of natural gas, and the separated gasoline is condensed and collected.

In a prior application filed May 8, 1924, Serial No. 711,779 Patent No. 1,560,137 there is described an improved method and apparatus in which the liquid absorbent, charged with absorbed gasoline following the absorption treatment, is preheated under pressure and in which, after an initial separation of gases, vapors and liquids, the preheated liquid is passed in countercurrent flow and in direct contact with the preheated gases and vapors under a lower pressure than that prevailing in the preheating operation to complete the removal of absorbed hydrocarbons from the liquid absorbent. The present invention relates particularly to improvements in the method and means for reducing the pressure after the preheating operation and for effecting the initial separation of gases, vapors and liquids after the preheating operation in recovery operations of this general character. The present invention also includes improved methods and means for handling the absorbent menstruum and for effecting and controlling the dephlegmation of the gasoline vapors distilled from the liquid absorbent.

According to the present invention, the pressure employed in the preheating operation is maintained by a column of liquid discharged from the preheating operation into a separator where the initial separation of vapors and gases from the liquid is effected. In the preheating operation of this invention, no substantial separation of vapors or gases from the liquid absorbent is effected, but all of the liquid absorbent and the absorbed constituents supplied to the preheating operation are discharged therefrom through the liquid column which maintains the pressure on the preheating operation. The pressure on the preheated liquid absorbent and absorbed constituents is thus reduced as they rise through this liquid column, and after this reduction in pressure the initial separation of absorbed constituents from the liquid is effected. The pressure reduction is determined by the length of the liquid column through which the liquid is discharged from the preheating operation to the separator, and when once the required length of this column to give the desired pressure reduction is ascertained and the apparatus so constructed the control is substantially automatic. By discharging together all of the preheated constituents from the preheating operation, the operation and the apparatus are simplified, and an improved separation is effected after the pressure is reduced. The separated vaporized constituents and liquid constituents are then passed in countercurrent flow and in direct contact as described in the prior application identified above.

Likewise, according to the present invention the denuded absorbent, after separation of the absorbed gasoline constituents, is cooled by indirect heat exchange with an external cooling medium before it is returned to the initial absorption operation in the treatment of the raw gas mixture, and part of the cooled denuded absorbing medium discharged from this cooling operation is recycled and admixed with the warm denuded absorbing medium circulating from the stripping operation to the cooling operation. In this way, the effectiveness of the cooling operation is increased. The recycled cooled absorbent assists in cooling the warm denuded absorbent by taking up heat therefrom as it is directly admixed therewith, and the rate and efficiency of heat transfer in the cooling operation is also increased because of the increase in velocity of flow of the denuded absorbent therethrough effected by the increase in volume due to the recirculation of part of the cooled absorbent. The temperature range over which the denuded absorbent must be cooled in the cooling operation proper to secure an equivalent cooling effect is also reduced where part of the cooled absorbent is recycled.

In carrying out the complete process of the present invention, the denuded absorbent from the stripping operation may be employed for cooling and dephlegmating the vapors separated from the absorbent in the stripping operation by indirect heat exchange therewith, and according to this invention, part of the cooled absorbent may with advantage be recycled with the denuded absorbent employed for promoting the dephlegmation operation. The denuded absorbent may be partly cooled before being employed in the dephlegmation operation and further cooled thereafter before being returned for further treatment of the raw gas mixture, and part of the cooled absorbent from the last cooling operation may be recycled and admixed either with the denuded absorbent passing to the first cooling operation or to the dephlegmation operation. In such an operation, the amount of cooled absorbent available for cooling the separated vapors in the dephlegmation operation is increased and an improved method of controlling the dephlegmation operation is provided. Here also, an increase in the velocity of flow of the cooled absorbent through the dephlegmation operation with consequent increase in the rate and efficiency of heat transfer is provided by the increase in volume of the absorbent circulating therethrough effected by recycling part of the absorbent through this operation.

This invention will be further described in connection with the accompanying drawings illustrating in a diagrammatic and conventional manner apparatus embodying the invention and adapted for carrying out the process of the invention; but it is intended and will be understood that this illustration and further description are for the purpose of illustrating the invention and that the invention is not limited thereto. The accompanying drawings illustrate in elevation and partly in section an apparatus for the recovery of gasoline from natural gas in accordance with the present invention.

Referring to the drawings, natural gas, or other gas mixture containing condensible hydrocarbons, is supplied to the lower end of the scrubbing tower 1 through connection 2 and a suitable liquid absorbing menstruum is supplied to the upper end of the tower through connection 3. A series of baffles or other gas and liquid contact promoting elements are arranged within the tower and as the gas flows upwardly therethrough it is intimately contacted with the absorbent flowing downwardly thereover. Suitable absorbents comprise mineral seal oil, naphtha of high initial boiling point, cresol, etc. Mineral seal oil, for example, may be supplied to the upper end of the scrubbing tower at the rate of about 20 gals. per gal. of gasoline to be recovered. The stripped gas escapes from the upper end of the tower through connection 4 and the charged absorbent containing the absorbed constituents is withdrawn from the lower end of the scrubbing tower through connection 5 by means of pump 6.

From the scrubbing tower 1 the charged absorbent is pumped through the tubes of the heat exchanger 7 to the heater 8, passing through the tubes of the heater. In the heater the charged absorbent is preheated by steam supplied to the space about the tubes through connection 9. A steam trap 10 is provided for discharging condensed water from the space about the tubes in the heater, and where such a trap is employed the temperature can be controlled by regulating the pressure of the steam admitted to the heater. The charged absorbent may be heated to a temperature of from about 400° to 450° F. or somewhat more in the heater 8. From the heater 8 the preheated absorbent and absorbed constituents are discharged into the separator 11 through the connection 12.

The separator 11 is arranged at some distance above the heater 8 so that the liquid column extending through the connection 12 imposes pressure upon the contents of the heater exceeding that prevailing in the separator by an amount dependent upon the heighth of this liquid column. This pressure differential may be as much as 15 to 20 lbs. per sq. in. or somewhat more. As the preheated absorbent and absorbed constituents rise through the connection 12 the pressure thereon is gradually reduced and as they are discharged into the separator 11 a separation of gases and vapors and liquid takes place because of the reduction in pressure. The separated gases and vapors escape from the upper end of the separator through connection 13 and the liquid through connection 14. A series of baffles 15 are arranged in the upper part of the separator above the inlet from connection 12 to inhibit entrainment of liquid constituents in escaping vapors and gases. The connection 14 is arranged to provide a trap to prevent the escape of gases and vapors from the lower end of the separator.

From the separator 11 the gases and vapors are introduced into the lower end of the exhausting or stripping column 16 which is provided interiorly with a number of baffle plates or bubble plates for promoting contact and heat exchange between vapor and gas and liquid constituents. The liquid from the separator is introduced into the exhausting column over the baffle plates or bubble plates so that in flowing downwardly through the exhausting column it is contacted in countercurrent flow with the previously separated vapors and gases. A thorough stripping of absorbed constituents from the liquid absorbent is thus effected in an efficient manner; the separated gases and vapors, including the gasoline vapors absorbed from the original raw gas mixture, pass upwardly to the dephlegmator 17 arranged above the exhausting column and the denuded absorbent collects in the reservoir 18 in the lower part of the exhausting column. Any condensate produced from the vapors in the dephlegmator is returned to the upper end of the exhausting and stripping column.

The heater 8, the separator 11, the exhausting or stripping column 16, and the dephlegmator 17, and all of the connections between these elements of the apparatus are thoroughly lagged or heat insulated to prevent loss of heat.

The denuded absorbent, while still warm, is circulated from the reservoir 18 through connection 19 to the heat exchanger 7 where it flows about the tubes and gives up part of its heat to the charged absorbent flowing therethrough from the scrubbing tower 1 to the heater 8, and is in turn partially cooled. A pair of coolers 20 and 21 are provided through the tubes of which cooling water is circulated from connection 22 and discharged through connection 23. The partially cooled denuded absorbent is withdrawn from the heat exchanger 7 through connection 24 by means of pump 25 and is pumped through the cooler 20 about the tubes therein, being discharged therefrom through the connection 26. Cooled denuded absorbent is supplied to the upper end of the space about the tubes in the dephlegmator 17 from connection 26 through connection 27 and is discharged from the lower end of the space about the tubes in the dephlegmator through connection 28 to the cooler 21. A by-pass connection 29 is also provided for discharging oil directly from the cooler 20 to the cooler 21, and control valves 30, 31 and 32 are provided for regulating the flow of denuded absorbent to the dephlegmator 17 and to the cooler 21. From the cooler 21, cooled denuded absorent is discharged through connection 33, and cooled absorbent is supplied to the upper end of the scrubbing tower 1 through connections 33 and 34.

A by-pass connection 35 is arranged between connection 33 and the suction side of the pump 25 for recycling part of the cooled absorbent through the first cooler 20 and the dephlegmator 17 in admixture with the denuded absorbent discharged from the heat exchanger 7 through connection 24. Valves 36 and 37 are provided for regulating the proportion of cooled absorbent so recycled. The recycled cooled absorbent assists in cooling the denuded absorbent from the heat exchanger 7 as it is admixed therewith and by increasing the total volume of liquid circulating through the coolers 20 and 21 and the dephlegmator 17 increases the rate and efficiency of heat transfer therein by increasing the velocity of flow therethrough. Additional cooling may also be provided for in the dephlegmator in this manner. A thermostatically controlled valve 38 may be arranged in the by-pass 29, controlled by a thermostat 39 in the upper end of the dephlegmator 17, for controlling the dephlegmation operation by regulating the proportion of the cooled absorbent from the cooler 20 circulating about the tubes in the dephlegmator in accordance with changes in the temperature of the vapors escaping from the dephlegmator. Another method of cooling the vapors passing through the dephlegmator 17 is to circulate all or part of the charged absorbent from the scrubbing tower about the tubes therein. Connections 40 and 41 for this purpose are shown in dotted lines on the drawings. The charged absorbent from the scrubbing tower may thus be employed to assist in dephlegmating the vapors separated from the absorbent while at the same time being preheated by the heat given up by the vapors. From the upper end of the dephlegmator 17 the vapors separated from the absorbent including the absorbed gasoline constituents escape through connection 42 to the condenser 43 where they are condensed, the condensate being discharged to a receiver or other suitable storage receptacle through connection 44.

A control valve 45 may be arranged in the connection 12 for supplementing the control of the pressure in the heater 8 that is provided by means of the liquid column between the heater and the separator 11. Valves 46 and 47 may also be arranged in the liquid and gas and vapor discharge connections from the separator 11 respectively for further regulating and reducing the pressure between the separator and the exhausting or stripping column 16. While the invention has been described particularly in connection with an operation in which superatmospheric pressure is maintained upon the absorbent and absorbed constituents in the heater 8, it is also applicable where a sub-atmospheric pressure is employed in the exhausting or stripping column and where a higher pressure which may, however, be atmospheric or subatmospheric is maintained in the heater.

I claim:

1. A process of separating absorbed hydrocarbon constituents from liquid absorbing mediums, which comprises heating the charged medium without any substantial separation of vapors therefrom, reducing the pressure thereon and after the pressure reduction effecting a separation of vapor and liquid constituents, and passing the separated liquid constituents in countercurrent flow and in direct contact with the separated vapor constituents.

2. A process of separating absorbed hydrocarbon constituents from liquid absorbing mediums, which comprises heating the charged medium without any substantial separation of vapors therefrom while maintaining a pressure of a communicating column of the charged liquid medium thereon, effecting a separation of vapor and liquid constituents at the top of the liquid column where the pressure is less than that in the heating operation, and passing the separated liquid constituents in countercurrent flow and in direct contact with the separated vapor constituents.

3. A process of separating condensible hydrocarbon constituents from gas mixtures containing the same, which comprises absorbing such condensible constituents from the gas mixture in a liquid absorbing medium, heating the charged absorbing medium by heat exchange with an external heating medium and subsequently effecting a separation of the absorbed constituents from the absorbing medium, dephlegmating the separated absorbed constituents by heat exchange with the separated absorbing medium after cooling the same, cooling the absorbing medium from the dephlegmation and returning it to the first mentioned treatment of the gas mixture, and recycling part of the cooled absorbing medium from the last mentioned cooling operation and admixing it with the absorbing medium circulating to the said dephlegmation.

4. An apparatus for separating absorbed constituents from liquid absorbing mediums, which comprises a heater and connections for supplying charged absorbing medium thereto, a separator positioned above the heater and connections for discharging liquid from the heater to the separator having a liquid column therein whereby a higher pressure is maintained in the heater than in the separator, and an exhausting column and connections for conveying vapors and liquids respectively from the separator to the lower and upper ends thereof.

In testimony whereof I affix my signature.

HAROLD B. BERNARD.